Oct. 31, 1967  J. J. BUNDSCHUH  3,350,023
SPROCKETLESS MOTION PICTURE PROJECTOR
Filed July 6, 1965
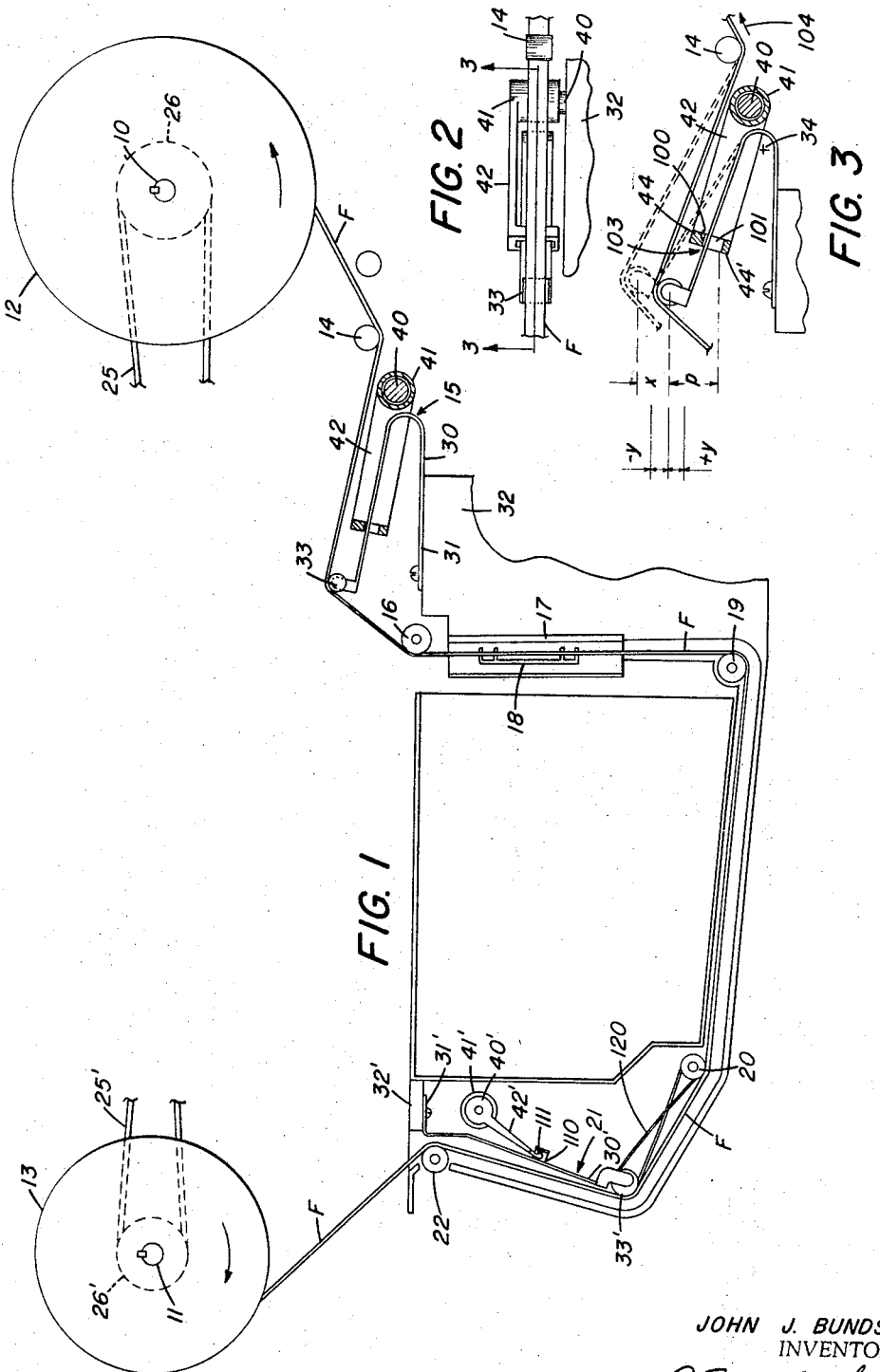
JOHN J. BUNDSCHUH
INVENTOR.
BY R. Frank Smith
ATTORNEYS

United States Patent Office 3,350,023
Patented Oct. 31, 1967

3,350,023
SPROCKETLESS MOTION PICTURE PROJECTOR
John J. Bundschuh, Penfield, N.Y., assignor to Eastman Kodak Company, Rochester, N.Y., a corporation of New Jersey
Filed July 6, 1965, Ser. No. 469,500
8 Claims. (Cl. 242—55.11)

ABSTRACT OF THE DISCLOSURE

This application discloses a sprocketless motion picture projector having film snubbing means adapted to engage the film between the supply reel and the projection gate. The film snubbing means is resiliently responsive to variations in film tension and has a first mode of resilient response during variations in film tension resulting from operation of an intermittent film advancing mechanism and a second mode of resilient response during large variations in film tension resulting from the inertia of the supply reel.

---

The present invention relates to motion picture projectors, and particularly to a sprocketless motion picture projector capable of handling film reels of 400′ capacity.

The conventional motion picture projector intermittently feeds the film a frame at a time past the projection aperture of a gate and depends upon the presence of a free loop of film in advance of and beyond the gate to isolate the intermittent film feed and gate from the supply reel and take-up reels to insure a steadiness of the film in the gate when the intermittent mechanism is not moving film. Ordinarily these free film loops at each side of the gate are maintained by constantly rotating feed sprockets which advance the film from the supply reel to the gate and from the gate to the take-up reel at such a rate as to maintain these free loops. At the same time these sprockets isolate the film in the gate from any transient forces on the film originating at the reels for one reason or another and which transient forces might tend to cause an unsteadiness of the film in the gate.

Sprocketless projectors have been marketed but their satisfactory operation has been limited to projectors using reels of not more than 200′ capacity and/or projectors which are adapted to only one speed of operation and/or ones which are not reversible. A sprocketless projector is one which does not have one or more constantly driven sprockets for feeding the film to and from free loops at both sides of the gate. Instead of sprockets these projectors rely upon the use of a spring-loaded snubber, or the like, located between the gate and each reel to maintain the equivalent of a free loop of film at each side of the gate and isolate the intermittent film advancing mechanism and gate from any excessive loads which might be imposed on the film in the gate because of the inertia of the supply and take-up reels, and their drive mechanisms.

When an attempt was made to use 400′ reels on known sprocketless projectors capable of handling reels up to 200′ capacity, it was found that an unsteadiness in the projected image occurred which was not tolerable. This was found to be primarily the result of the added inertia which the 400′ reel has over that of a 200′ reel. The added inertia of these larger reels was found to produce transient loads on the reach of film between the reel from which the film was being delivered and the spring-loaded snubber located between that reel and the gate and the intermittent film feeding mechanism which the snubber could not accommodate. These transient loads which the snubber could not accommodate were found to be prevalent in projectors capable of operating at only one speed and having no reverse drive, and resulted from a number of different causes including reel "pick," which occurs when the film might frictionally engage the reel flange momentarily because of a bent flange, reel wobble, etc., unintentional momentary stoppage or speed-up of the delivery reel by the operator touching the same while it is running, etc. In addition to these enumerated causes of transient loads on the film noted above and common to simple projectors, when the projector is one of the variable rate type, such as disclosed in pending application Ser. No. 371,938, filed June 2, 1964 now Patent No. 3,261,654 in the names of Faber and McClellan, and in which the rate of projection can be shifted rapidly without stopping the film feeding mechanism, a heavy and abrupt transient load is imposed on the film which the conventional snubber cannot handle. Also, when such a projector is quickly reversed, the same thing happens. These transient loads, depending upon their size and duration, vary the tension in the reach of film engaged by the snubber and impose an abnormally low frequency surge on the normal high frequency oscillation under which the snubber is designed to operate. The result is that the snubber is momentarily overextended in its movement and an excessive load is placed on the intermittent film feeding mechanism which causes it to fail to properly register the successive frames of film at the projection aperture of the gate. In attempting to smooth out these surges resulting from transient loads, the snubber will over-correct in the opposite direction and a hunting action occurs before the snubber finally settles down to its normal frequency of operation again. During this interval in which the snubber is not operating at its normal frequency, the picture is moving up and down on the screen and this may occur for many successive frames of film before the surge due to the transient load is smoothed out by the snubber. Depending upon the repeatability of occurrence of these transient loads this unsteadiness in film projection can occur throughout the major portion of an entire film presentation. It will be obvious that the effect of these transient loads on the film snubbers will increase as the size of the film reels increase because they directly increase as the mass of inertia of the reels.

The primary object of the present invention is to provide a sprocketless projector which will satisfactorily accommodate 400′ or larger reels without being subject to an undesirable unsteadiness of picture due to transient loads which may be applied to the film during projection.

A further object is to provide a sprocketless projector which has a snubber between the delivery reel and the film gate and intermittent film feeding mechanism which will adapt the projector for use with reels larger than those which conventional sprocketless projectors are able to accommodate without being subject to undesirable unsteadiness of the projected picture.

And yet another object is to provide a sprocketless projector which will accommodate 400′ reels even though the projector is capable of being quickly shifted between different rates of projection while running in either forward or reverse.

Still another object of the present invention is to provide a sprocketless projector in which the reel from which the film is being delivered is adapted to normally resist such film delivery and the spring-loaded snubber acting to form the equivalent of a free loop of film ahead of the projection gate and the intermittent film feeding mechanism is designed to accommodate and quickly damp out any increase in tension in the reach of film engaged thereby and caused by a transient load applied to the film delivery reel. As a result, any unsteadiness occurring in the projection of the film due to this transient load will be quickly damped out in a very few frames rather than lasting for a noticeable time.

And another object of the present invention is to provide for use in a sprocketless projector a damped film snubber which will oscillate freely so long as the tension in the reach of film engaged thereby is within a normal range but will have its oscillation damped when a transient load applied to the film causes the snubber to deflect beyond its normal range of movement for any reason. The damping action is applied to the snubber through the use of a stable damping means and in such a way that the damping action varies in direct relation to the rate at which the snubber engages the dampener so that the snubber is quickly restored to its normal frequency of oscillation.

And still another object of the present invention is to provide a sprocketless projector in which the snubber is normally operated in a biased condition so that it remains in contact with the film at all times and will thus keep the snubber in control of the film loop it engages despite negative surges which might be encountered.

The novel features that I consider characteristic of my invention are set forth with particularity in the appended claims. The invention itself, however, both as to its organization and its methods of operation, together with additional objectives and advantages thereof will best be understood from the following description when read in connection with the accompanying drawings in which:

FIG. 1 is a schematic view of a sprocketless projector having a film feeding and guiding system constructed in accordance with a preferred embodiment of the present invention;

FIG. 2 is a plan view of the damped snubber forming a part of the present invention, and FIG. 3 is a sectional view taken substantially on line 3—3 of FIG. 2 and constitutes a schematic force diagram of the damped snubber.

Generally speaking, the present invention relates to a sprocketless motion picture projector which is reversible without stopping the prime mover and in which the rate of projection can be rapidly changed while the projector is operating in either direction. It is also capable of handling film reels up to 400' capacity without showing an undesirable unsteadiness in the projected picture. Each of the support spindles for the supply and take-up reels is adapted to resist delivery of film from reels mounted thereon and resulting from the operation of a reversible intermittent film feed means arranged adjacent the gate to intermittently advance film therethrough. A damped, spring-loaded snubber is located between each reel spindle and the gate and is biased to act on these reaches of film and provide the equivalent of a free loop at each end of the gate to isolate the gate and intermittent film feed adjacent thereto from any direct pull on the film induced by the normal and/or erratic rotation of the reels. These snubbers are so designed and arranged as to oscillate freely and at a normal frequency commensurate with that of the intermittent film feed mechanism when the reach of film engaged thereby, and being delivered from the reel with which each is associated, remains within a normal range of values encountered when the projector is operating under normal film loads.

When the snubber is caused to deflect beyond its normal period of oscillation as the result of some transient load causing an unusual increase in tension in the reach of film engaged by the snubber, the snubber contacts a stable damping means which applies a damping force to the movement of the snubber which varies as the rate of movement of the snubber. At the same time the spring constant or stiffness of the snubber spring is immediately increased so that a greater force is required to deflect the snubber. When the damped snubber stops moving in one direction the spring constant of the snubber returns to its original value. The dampener also has the same effect on the return movement of the snubber. This rate responsive damping action on the snubber will re-occur until the snubber returns to its normal frequency of oscillation and at which time it oscillates free of the dampener. This damped snubber acts to reduce the total travel of the snubber due to a transient load and, therefore, reduces the duration of unsteadiness of the picture being projected which is caused by such transient load.

In accordance with the present invention the snubbers are so disposed in the film path that even when the reach of film they engage is subjected to tensions within the normal range of operation, the snubbers are operating under a biased condition. This is believed to be a new concept with this system for sprocketless projectors and is advantageous in that it keeps most negative surges within the tight snubber film system, e.g., the snubber remains in engagement with the film even if a negative surge tends to cause an excess of film to be fed into the reach of film engaged thereby (when film disengages the snubber for any reason the system is powerless to absorb or damp forces applied during that portion of the cycle). This tends to minimize large negative transients which might be encountered at the time the projector is reversed because of time lags in the clutch mechanisms acting on the reels to resist delivery of film therefrom.

Referring now to the drawings, and particularly FIG. 1, the film feeding and guiding system of a sprocketless projector constructed in accordance with a preferred embodiment of the present invention is shown as comprising a supply spindle 10 and take-up spindle 11 on which supply and take-up reels 12 and 13, respectively, are adapted to be mounted so as to be keyed to said spindles to rotate therewith. The film F leaving the supply reel 12 is threaded under a guide roller 14, over a snubber 15, then another guide roller 16 and through a conventional projection gate 17 where it is engaged by any conventional type of intermittent film feeding means, here shown as a double claw 18 to be advanced through the projection aperture (not shown) of the gate for projection of successive picture frames onto a screen. This intermittent film feeding mechanism is preferably selectively reversible so that the film can be projected in reverse if desired. It may be of the type disclosed in the above-noted co-pending application Ser. No. 371,938 now Patent No. 3,261,654. After leaving the gate 17 the film passes successively over guide rollers 19 and 20, over a second snubber 21, then another guide roller 22 and finally to the take-up reel 13.

So that the feed of the film can be selectively reversed at any time in a simple manner by merely reversing the intermittent film feeding mechanism both reel spindles 10 and 11 are tendency driven at all times in a direction to take up film. The drive for each of the spindles is shown as comprising separate drive belts 25 and 25' engaging pulleys 26 and 26' which are connected to the supply and take-up spindles by slipping clutches, not shown, the driving forces of which clutches can be continuously adjusted in response to changes in weight and/or change in diameter of the coil of film on the reels, as is well known, so that at any time the take-up forces applied to the film by the reels will substantially balance each other and when the film claw is not engaging the film there will be no tendency of one reel or the other to pull film through the gate. This arrangement whereby both the take-up and supply reels are driven in a take-up direction is not critical to the present invention but is useful only in providing a sprocketless projector which can be reversed merely by reversing the intermittent film feeding means, all as disclosed in the above-noted co-pending application. So far as the nubber action of the present film feeding and guiding system is concerned, this tendency reel drive constitutes a resistance to the delivery of film from either reel which the intermittent film feeding member and snubbers must overcome. In sprocketless projectors not capable of reverse operation this resistance factor would apply only to the supply reel and could be achieved by the use of any type of slipping hold back mechanism applied to the supply spindle 10, e.g., a friction clutch. Also in this last-mentioned case only one snubber 15 would be required since film would not be pulled from the take-up reel except possibly for rewind purposes.

The snubber 15 comprises a flat spring 30 of low mass fixed at one end 31 to a stationary part 32 of the projector frame and having a guide roller 33 mounted on its free end to engage the lower surface of film F. The effective pivot point of the spring 30 is approximately at point 34, see FIG. 3. Guide roller 14 and the snubber 15 are so disposed relative to one another that the film F must always contact roller 14 regardless of the film capacity of supply reel 12 or the load on the film thus controlling the geometry of the film path between the snubber and the intermittent film feeding mechanism 18. When a film F is properly threaded from the supply reel, over the snubber 15 and into engagement with the intermittent film feeding mechanism 18, the snubber spring 30 is biased downwardly by the film of the loop formed by the snubber ahead of the gate so that the snubber maintains contact with the film loop even if the film is subjected to a negative surge (opposite its normal direction of travel, which is downward for forward projection) by a transient load applied to the supply reel which would be in a direction to decrease the tension on the reach of film engaged by the snubber. This disposition of the snubber means that the snubber will maintain control of the film under all excepted transient load conditions and be able to absorb and damp out surges in the film tension caused by such loads regardless of in what part of the intermittent film feeding cycle the transient loads might occur.

The stiffness of the snubber spring 30 is such that under normal operating conditions during the positive part of the intermittent film feeding cycle, or at the time the intermittent film feeding means 18 is advancing film through the gate by one frame length, the intermittent feed means is able to overcome the snubber 15 and pull film from the loop formed by the snubber and/or the supply reel without damaging the engaged film perforation. During the negative part of the intermittent cycle, or when the claw is not advancing film, the snubber spring has a stiffness which will allow it to return to its initial position and in so doing overcome the resistance to delivery of the supply reel and pull approximately one frame length of film from the reel and restore the film loop to its original size. The tension on the film gate is such that during this negative part of the film advancing cycle it will hold the film stationary against the return movement of the snubber to its original position thus causing the snubber to pull film into the loop from the supply reel.

So long as the tension in the reach of film engaging the snubber 15 remains within the normal range resulting from anticipated loads imposed on the film during normal operation of the projector the snubber 15 and the guide roller 33 forming a part thereof will oscillate at a normal frequency as determined by the speed of operation of the intermittent film feeding mechanism 18. The oscillation of the snubber will be between a first position to which it is moved by its spring 30 to restore the film loop when the intermittent mechanism is not advancing film, and a second position to which it is moved as the intermittent film feeding mechanism foreshortens the film loop by advancing a frame length of film therefrom through the gate. The amplitude of this normal oscillation of the snubber is indicated by the distance $p$ in FIG. 3.

Spring snubbers of this nature have been used on motion picture projectors in the past. However, all of them have had an unsteadiness problem when the reach of film in contact with the snubber was subjected to a transient load. This transient load is any uncommon load encountered by the film which would change the tension in the reach of film engaging the snubber to go beyond the range of normal limits encountered in the normal operation of the projector. This transient load is generally one which tends to increase the tension in the film engaged by the snubber and could result from any one of a number of things tending to increase the resistance to delivery of film from the supply reel, e.g., a bent film reel, a sticky clutch on the reel spindle, accidental contact with the supply reel which would tend to momentarily stop it or slow it down, etc. In projectors capable of having their rate of projection changed without stopping the film feeding mechanism and/or capable of being reversed without stopping the motor, see above-noted application Ser. No. 371,938, now Patent No. 3,256,654, these transient loads might arise at the time the speed of projection is changed or when the projector is reversed.

The unsteadiness problem resulting from transient loads is well known in the art and arises by reason of the fact that the film tension in the reach of the film engaged by the snubber momentarily attains values which make it impossible for the intermittent mechanism to accurately advance the film through the gate by one frame length during its advance stroke and/or when the claw leaves the film the gate tension is not sufficient to hold the film still in the gate and it tends to back up slightly. The result is that the picture projected on the screen instead of remaining steady will shift up and down and appear unsteady. It should be understood that these transient loads will appear as a low frequency surge imposed on the high frequency snubber action induced by the rate of operation of the intermittent film feeding mechanism so that the unsteadiness of the picture on the screen will occur as projection of the picture proceeds.

While snubbers have been used which would satisfactorily accommodate transient loads encountered in projectors having supply reels up to 200′ capacity, when reels as large as 400′ capacity were used these snubbers could not accommodate the transient loads. By this is meant that the snubbers could not damp out the low frequency surge imposed on the high frequency snubber action as the result of the transient load and the unsteadiness of picture would persist for a length of time which becomes annoying to the viewer. This is primarily due to the fact that 400′ reels have much greater inertia than the smaller reels and this added inertia increases the effect of the transient loads encountered.

To overcome this problem and make it possible to make a sprocketless projector which will satisfactorily accommodate reels of 400′ capacity, I devised a snubber damping mechanism which will damp out the effects of transient loads on the snubber and return the snubber to its normal frequency of operation within a period which is so short that any picture unsteadiness resulting from such transient load is so small in size and duration as not to be objectionable. To this end there is provided a viscous dampener comprising a stub shaft 40 rotatably mounted in a cup 41 with a viscous damping fluid between the two. The clearance between the cup and the shaft can be in the order of a few thousandths of an inch, although in drawings this dimension is exaggerated for purposes of illustration, and the viscous damping fluid may be a silicone fluid, e.g., Dow #200 Silicone Fluid, having a viscosity of 300,000–700,000 centistokes. This silicone fluid in effect acts as a lubricant between the shaft and cup and the assembly constitutes a stable damper which is rate-sensitive. The damper is stable because an arm 42 fixed to cup 41 will remain in any position to which it is moved by a force, and is rate-sensitive because the resistance to rotation of the arm 42 will vary directly as the rate of a turning force applied thereto.

The dampener is loosely coupled to the snubber by having spaced cross bars 44 and 44′ on the end of arm 42 extend transversely of the snubber spring 30. It will thus be seen that the snubber spring 30 is permitted a certain range of oscillatory movement without engaging one of the cross bars. Referring to FIG. 3, the spaces 100 and 101 formed by this loose coupling at point 103 is chosen to allow free action of the snubber spring when the film deflects the roller on the end of the snubber spring a full picture frame during the pull down stroke of the intermittent film feed. Since the damper is stable the arm 42 will stay in whatever position it is in unless acted upon by the snubber spring.

Referring to FIG. 3, under normal pull down conditions constant tension is supplied the film by the tendency drive acting on the supply reel 12 and resisted by friction in the gate 17 causes snubber spring 30 to deflect a distance $x$ from the dotted line position to the solid line position. At start up the damper arm 42 assumes a position corresponding to this bias position within a few cycles of the intermittent film feed mechanism so as to allow normal film advance by the intermittent film feed mechanism to occur within spaces 100 and 101 without spring 30 contacting either cross bar 44 or 44' of the damper arm 42. Force on the film before a pull down stroke is now $kx$ due to the bias under which the snubber is operating and at the end of the pull down stroke the force is $k(x+p)$ if $p=$ the pitch of the perforations of the film and $k$ is the force rate of the spring.

The frequency of the pull down strokes is relatively high (6 to 54 cycles per sec.) and the actual pull down stroke is very fast (6 milliseconds). Because of the speed of the pull down stroke the mass of the snubber must be kept to an absolute minimum. In addition, it precludes any direct connection to a massive or rate-sensitive damping element because the accelerations during pull down are in excess of 60 G's. Since it only takes 20–40 ounces of pull to rupture a film perforation, direct connection to massive rate-sensitive elements for purposes of damping out low frequency surges is out of the question.

When a low frequency surge is superimposed on the high frequency snubber action by a transient load, it has the effect of changing the normal deflection $x$ of the snubber by a value $\pm y$, the sign of $y$ depending upon whether this added deflection $y$ is applied to the pull down stroke of the intermittent film feed (in which case it has a positive sign) or on the return stroke thereof (in which case it is negative). Since spaces 100 and 101 will only accommodate pitch $p$ such surges $\pm y$ cause contact between the snubber spring 30 and the damper arm 42 during each cycle that the surge exists and during both the plus and minus phases of the surge.

When such contact occurs during the positive half cycle (when the intermittent film feeding mechanism is advancing film) it instantly shifts the effective pivot point 34 of the snubber spring 30 to some position closer to point 103 because at the moment of impact the damper is acting as a fixed pivot due to the speed at which the impact occurs, see FIG. 3. This effectively shortens the snubber spring and stiffens it, and as a result its natural frequency is increased, thus allowing energy of the surge to be transferred to the rate damper while still maintaining compromised snubber spring activity. This action puts additional load on the intermittent film feed while it is advancing film but not enough to cause film damage. During the negative half cycle (upstroke) the damper is effective without having any effect on the pull down stroke of the intermittent film feeding mechanism. Preferably, the position of point 34 relative to roller 33 and point 34 (FIG. 3) should be chosen as a balance between effective damping and snubber action during the damping cycle.

It is pointed out that the normal bias applied to the snubber spring 30 resulting from constant film tension is a new concept with this system for sprocketless projectors. It serves to keep most negative surges caused by transient loads within a tight snubber film system and practically eliminates a condition where the roller 33 leaves contact with the film and under which condition the system is powerless to absorb or damp the snubber during that part of its cycle. It also tends to minimize the effects of large reversing transients which might result from time lags in the spindle drive clutches when the projector is reversed.

If the projector is capable of reverse operation, as that disclosed is, then a second snubber 21 is located between the take-up reel 13 and the film gate 17. When the projector is operating in reverse, this snubber 21 operates in the same manner as snubber 15 operates when the projector is operating in a forward direction. Snubber 21 differs from snubber 15 only in the manner in which it is loosely coupled to the viscous dampener. The snubber 21 comprises a spring member 30' anchored at one end 31' to a stationary point 32' of the projector frame and carries on its free end a roller 33' which engages the reach of film F extending between the take-up reel 13 and the gate 17. Fixed to the snubber spring 30' is an L-shaped member 110 whose upright arm 111 is spaced from the spring 30'. Into this space between arm 111 and the spring 30' the end of damper arm 42' extends, said damper arm being fixed to rotate with a shaft 40' rotatably mounted in a cup 41 with a viscous damping fluid separating the two as described above in connection with dampers for snubber 15. In projectors not capable of being reversed, it will be obvious that snubber 21 will not be required since it is provided only for reverse operation of the projector and functions when take-up reel 13 is acting as a delivery reel for the film being projected. A crossed strap 120 embracing a central undercut portion of guide roller 33' and guide roller 20 limits the movement of snubber spring 30' when there is no film F threaded thereover. A similar stop, not shown, could be provided for the free end of snubber spring 30 if necessary, or a stop pin fixed to a stationary part of the projector frame could be provided to this end. Since both snubbers 15 and 21 are operated under a bias, the strap 120 acting on snubber 21 or its equivalent, not shown, acting on snubber 15 are not effective when film is threaded through the system.

By way of summary, it will be apparent from the above description that by providing means for interjecting into the intermittent film feeding system of a motion picture projector a resistance or rate-sensitive element for quickly bringing the system back to normal oscillation after a transient load has imposed an abnormal oscillation on the snubber of the system I have made it possible to produce sprocketless projectors capable of handling reels of larger capacity than is possible with known systems. The combination with such a sprocketless system of a damped snubber the stiffness of whose spring is varied in a direct relation to the rate at which the snubber is coupled to the dampener results in a rapid smoothing out of any low frequency surge which might be imposed on the reach of film engaged by the snubber by a transient load. As a result of this combination it is possible to use supply reels of film as large as 400' capacity without the projector evidencing an objectionable unsteadiness in projection characteristic. So far as the inventor is aware, motion picture projectors having a known sprocketless film feeding and guiding system showed an intolerable unsteadiness characteristic when reels in excess of 200' capacity were used thereon.

The invention has been described in detail with particular reference to the preferred embodiments thereof, but it will be understood that variations and modifications can be effected within the spirit and scope of the invention as described hereinabove and as defined in the appended claims.

I claim:
1. In a sprocketless motion picture projector having a supply spindle on which a supply reel of film is adapted to be mounted; means normally acting on said spindle to resist delivery of film from a supply reel mounted on the spindle; a projection gate spaced ahead of said supply spindle; intermittently operated film feeding member adjacent said gate for drawing film directly from said reel and intermittently advancing it through said gate at a predetermined frequency; the combination comprising:
(a) a movable snubber member adapted to engage one surface of the reach of film extending between said supply reel and said intermittent film feeding member;
(b) means for mounting said snubber for movement transversely of the reach of film it engages from,
(1) a first position, wherein said snubber forms a loop of film between said supply reel and said intermittent film feeding member equal at least to one frame length of the film when said film feeding member is not advancing film to
(2) a second position, to which it is moved by the reach of film it engages in response to operation of said intermittent film feeding member to advance film through said gate by one frame and to correspondingly foreshorten said film loop,
(c) a spring normally urging said snubber to said first position and into engagement with said one surface of the film, said spring having a predetermined stiffness whereby said snubber normally oscillates freely at a normal given frequency, corresponding to the frequency of the intermittent film feeding member, over a path of given length corresponding to the advancement of one frame length of said film, so long as the variations in tension in that portion of said supply reel remain normal and within a given range; and
(d) means for increasing the resistance to movement of said snubber in response to an abnormal transient change in tension in that portion of said reach of film extending between said snubber and said reel causing an abnormal frequency of oscillation of said snubber to be superimposed upon said normal frequency of oscillation, to rapidly return said snubber to said normal frequency of oscillation.

2. In a sprocketless motion picture projector having a supply spindle on which a supply reel of film is adapted to be mounted; means normally acting on said spindle to resist delivery of film from a supply reel mounted on the spindle; a projection gate spaced ahead of said supply spindle; an intermittently operated film feeding member adjacent said gate for drawing film directly from said reel and intermittently advancing it through said gate at a predetermined frequency; the combination comprising:
(a) a movable snubber member adapted to engage one surface of the reach of film extending between said supply reel and said intermittent film feeding member;
(b) means for mounting said snubber for movement transversely of the reach of film it engages from,
(1) a first position, wherein said snubber forms a loop of film between said supply reel and said intermittent film feeding member equal at least to one frame length of the film when said film feeding member is not advancing film, to
(2) a second position, to which it is moved by the reach of film it engages in response to operation of said intermittent film feeding member to advance film through said gate by one frame and to correspondingly foreshorten said film loop,
(c) a spring normally urging said snubber to said first position and into engagement with said one surface of the film, said spring having a predetermined stiffness which allows said snubber to normally oscillate freely at a normal given frequency, corresponding to the frequency of the intermittent film feeding member, over a path of given length corresponding to the advancement of one frame length of said film so long as the variations in tension in that portion of said reach of film extending between said snubber and said supply reel remains normal and within a given range; and
(d) a stable damping member loosely coupled to said snubber to be engaged by said snubber during oscillatory movement thereof and caused by a transient load on said reach of film engaged by said snubber, said engagement between said damping member said snubber establishing a resistance to movement of said snubber in direct relation to the rate at which said snubber engages said damping member, said resistance returns to normal.

3. In a sprocketless motion picture projector having a supply spindle on which a supply reel of film is adapted to be mounted; means normally acting on said spindle to resist delivery of film from a supply reel mounted on the spindle; a projection gate spaced ahead of said supply spindle; an intermittently operated film feeding member adjacent said gate for drawing film directly from said reel and intermittently advancing it through said gate at a predetermined frequency; the combination comprising:
(a) a movable snubber member adapted to engage one surface of the reach of film extending between said supply reel and said intermittent film feeding member;
(b) means for mounting said snubber for movement transversely of the reach of film it engages from,
(1) a first position, wherein said snubber forms a loop of film between said supply reel and said intermittent film feeding member equal at least to one frame length of the film when said film feeding member is not advancing film, and
(2) a second position, to which it is moved by the reach of film it engages in response to operation of said intermittent film feeding member to advance film through said gate by one frame and to correspondingly foreshorten said film loop,
(c) a spring normally urging said snubber to said first position and into engagement with said one surface of the film, said spring having a predetermined stiffness which allows said snubber to normally oscillate freely at a normal given frequency, corresponding to the frequency of the intermittent film feeding member, over a path of given length corresponding to the advancement of one frame length of the film so long as the variations in tension in that portion of said reach of film extending between said snubber and said supply reel remains normal and within a given range;
(d) a stable damping member loosely coupled to said snubber to be engaged by said snubber during oscillatory movement of said snubber different than normal oscillatory movement thereof and caused by a transient load on said reach of film engaged by said snubber, said engagement between said damping member and said snubber establishing a resistance to movement of said snubber in direct relation to the rate at which said snubber engages said damping member, said resistance persisting until the oscillation of said snubber returns to normal; and
(e) means for varying the stiffness of said spring in direct relation to the rate at which said snubber engages said damping member to cause energy resulting from the transient load to be more rapidly transferred to said damping member.

4. In a reversible sprocketless motion picture projector having a supply spindle on which a supply reel of film is adapted to be mounted; a take-up spindle on which a take-up reel is adapted to be mounted; means normally acting on each of said spindles to resist delivery of film from a reel mounted thereon; a projection gate located between said supply and take-up spindles in spaced relationship therewith; a reversible intermittently operated film feeding member adjacent said gate for drawing film directly from one of said reels and intermittently advancing it through said gate in a direction depending upon the direction of operation thereof; the combination comprising:

(a) a first movable snubber adapted to engage one surface of the reach of film extending between said supply reel and said intermittent film feeding member;
(b) a second movable snubber adapted to engage one surface of the reach of film extending between said take-up reel and said intermittent film feeding member;
(c) means for mounting each of said snubbers for movement transversely of the reach of film it engages when film is being pulled from its associated reel from,
  (1) a first position, wherein it forms a loop of film between the reel with which it is associated and said intermittent film feeding member equal at least to one frame length of film when said film feeding mechanism is not advancing film, to
  (2) a second position, to which it is moved by the reach of film it engages in response to operation of said intermittent film feeding member to advance film through said gate by one frame and to correspondingly foreshorten said film loop;
(d) a separate spring normally acting on each of said snubbers and normally urging its associated snubber to said first position and into engagement with said one surface of the film, each of said springs having a predetermined stiffness which allows its associated snubber to normally oscillate freely at a normal given frequency, corresponding to the frequency of the intermittent film feeding member, over a path of given length corresponding to the advancement of one frame length of said film so long as the variations in tension in that portion of the reach of film extending between said snubber and its associated reel remains normal and within a given range; and
(e) sepaarte means associated with each one of said snubbers, operative when the film is moved in a direction to pull film from the reel associated therewith, to increase the resistance to movement of said snubbers in response tot he rate at which a resulting transient inertia load is applied to said film in that portion of the reach of film extending between said snubber and its associated reel on to rapidly return said snubber to said normal frequency of oscillation.

5. A sprocketless motion picture projector according to claim 1 in which said last-mentioned means includes a stable damping member having a damping action related to the rate at which a force is applied thereto; a lost-motion coupling between said damping member and said snubber for connecting said snubber to said damping member only when said snubber is subjected to a frequency of oscillation other than said normal frequency as the result of a transient load being applied to said film, said lost motion connection being effective to establish a damping effect on the movement of said snubber in direct relation to the rate at which said snubber is moving at the time said snubber is connected to said damping member.

6. A sprocketless motion picture projector according to claim 1, in which said spring and snubber comprises a leaf spring fixed at one end and having a film guiding member fixed to the free end thereof, respectively, and said last-mentioned means comprises a stable damping member having a damping action directly related to the rate at which a force is applied thereto; a lost-motion coupling between said damping member and said spring which establishes a connection between said spring and said damping member only when the snubber is subjected to a frequency of oscillation other than said normal frequency due to a change in tension in the reach of film engaged thereby as the result of a transient load applied to said film, said connection being effected whereby said damping member applies a damping action to the movement of said snubber in direct relation to the rate at which said snubber is moving at the time the connection is established and whereby the stiffness of said spring is changed to increase the natural frequency of the film guide mounted on the free end thereof.

7. In a sprocketless motion picture projector having means for rotatably supporting a film reel having inertia, the combination comprising:
(a) a film projector gate adapted to receive film from the reel;
(b) film advancing means associated with said gate for intermittently advancing film relative to said gate and for concomitantly establishing a tensional force on the film to rotate and pull film from the reel;
(c) film snubbing means positioned between the reel and said gate and operative to resiliently engage the film between the reel and said gate, said film snubbing means being resiliently responsive to variations in tension of the film to resiliently oppose displacement of the film and thereby smooth variations in tension of the film;
(d) means for establishing a first mode of resilient response of said snubbing means during intermittent variations in film tension resulting from intermittent advancement of film relative to said gate; and
(e) means for establishing a second mode of resilient response of said snubbing means during predetermined variations in film tension resulting from the inertia of the film reel.

8. In a sprocketless motion picture projector having means for rotatably supporting a film reel having inertia, the combination comprising:
(a) a film gate adapted to receive film from the reel;
(b) film advancing means associated with said gate for intermittently advancing film relative to said gate and for concomitantly establishing a tensional force on the film to rotate and pull film from the reel;
(c) film snubbing means positioned between the reel and said gate to be engaged and displaced by the film in response to variations in tension of the film during movement of the film from the reel to said gate;
(d) means for effecting a first mode of displacement of said film snubbing means during film tension variations resulting from normal intermittent movement of the film relative to said gate; and
(e) means for effecting a second mode of displacement of said film snubbing means in response to predetermined film tension variations resulting from inertia of the film reel.

References Cited
UNITED STATES PATENTS 2,287,792  6/1942  Foster _____ 226—59 X
3,022,960  2/1962  Foster _____ 242—75.3

LEONARD D. CHRISTIAN, *Primary Examiner.*

UNITED STATES PATENT OFFICE
CERTIFICATE OF CORRECTION

Patent No. 3,350,023                  October 31, 1967

John J. Bundschuh

It is hereby certified that error appears in the above numbered patent requiring correction and that the said Letters Patent should read as corrected below.

Column 4, line 67, for "nubber" read -- snubber --; column 10, line 2, after "movement" insert -- of said snubber different than normal oscillatory movement --; line 8, after "ance" insert -- persisting until the oscillation of said snubber --; column 11, line 41, for "tot he" read -- to the --; column 12, line 6, for "fi m" read -- film --.

Signed and sealed this 21st day of January 1969.

(SEAL)

Attest:

Edward M. Fletcher, Jr.
Attesting Officer

EDWARD J. BRENNER
Commissioner of Patents